United States Patent

Mino et al.

(10) Patent No.: US 9,151,378 B2
(45) Date of Patent: Oct. 6, 2015

(54) CONTROL DEVICE FOR TRANSMISSION

(71) Applicants: MITSUBISHI JIDOSHA ENGINEERING KABUSHIKI KAISHA, Okazaki-shi, Aichi (JP); MITSUBISHI JIDOSHA KOGYO KABUSHIKI KAISHA, Tokyo (JP)

(72) Inventors: Akira Mino, Toyota (JP); Seiichi Inukai, Kyoto (JP)

(73) Assignees: MITSUBISHI JIDOSHA ENGINEERING KABUSHIKI KAISHA, Okazaki-Shi (JP); MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/019,199

(22) Filed: Sep. 5, 2013

(65) Prior Publication Data

US 2014/0067210 A1 Mar. 6, 2014

(30) Foreign Application Priority Data

Sep. 6, 2012 (JP) ................................ 2012-196043

(51) Int. Cl.
| | | |
|---|---|---|
| G06F 7/00 | (2006.01) | |
| F16H 59/02 | (2006.01) | |
| F16H 61/662 | (2006.01) | |
| F16H 61/66 | (2006.01) | |

(52) U.S. Cl.
CPC ...... *F16H 59/0204* (2013.01); *F16H 61/66259* (2013.01); *F16H 2059/0221* (2013.01); *F16H 2061/6615* (2013.01)

(58) Field of Classification Search
CPC ..... F16H 61/0213; F16H 61/16; F16H 59/66; F16H 59/72; B60W 10/06
USPC ......... 701/51, 52, 60, 61, 65; 477/140, 97, 34
See application file for complete search history.

(56) References Cited

U.S. PATENT DOCUMENTS

| | | | |
|---|---|---|---|
| 2004/0266583 A1* | 12/2004 | Henneken et al. | 477/34 |
| 2005/0090355 A1* | 4/2005 | Ota et al. | 475/123 |
| 2008/0190676 A1* | 8/2008 | Imamura et al. | 180/65.2 |
| 2008/0208419 A1* | 8/2008 | Wolf et al. | 701/52 |
| 2009/0171541 A1* | 7/2009 | Sugiura et al. | 701/52 |
| 2011/0320094 A1* | 12/2011 | Plath et al. | 701/51 |

FOREIGN PATENT DOCUMENTS

JP 7-102791 B2 11/1995

* cited by examiner

*Primary Examiner* — Helal A Algahaim
*Assistant Examiner* — Shardul Patel
(74) *Attorney, Agent, or Firm* — Birch, Stewart, Kolasch & Birch, LLP

(57) ABSTRACT

When a MODE selector SW is manipulated while CVT automatic shifting mode is selected, the shifting mode is switched to STEP-AT automatic shifting mode. Then, when the shift lever of a shifting device is manipulated by the driver while the CVT automatic shifting mode is selected as the shifting mode of a CVT, the then-set automatic shifting control mode for the CVT is maintained whereas the shifting mode of the CVT is switched to sport mode. When the sport mode being selected as the shifting mode of the CVT is canceled, the shifting mode of the CVT is switched to the mode selected before the switchover to the sport mode, that is, the maintained automatic shifting control mode, unless the MODE selector SW is manipulated during execution of the sport mode.

4 Claims, 6 Drawing Sheets

CONTROL DEVICE FOR TRANSMISSION

BACKGROUND OF THE INVENTION

1. Field of the Invention

The present invention relates to a control device for a transmission, and more particularly, to control executed at the time of switchover of shifting mode.

2. Description of the Related Art

A continuously variable transmission capable of continuously varying its gear ratio, or what is called a stepless transmission, has hitherto been used in motor vehicles mounted with internal combustion engines. Such a stepless transmission has, as its shifting modes, a stepless automatic shifting mode in which the gear ratio is continuously variable, and a stepped manual mode in which the driver manually performs a shifting operation to select a specific gear train from among those having respective fixed gear ratios.

There has also been known a stepless transmission which is equipped with a plurality of gear trains with respective fixed gear ratios, as in a conventional stepped automatic transmission, and which has, as its shifting modes, a stepped automatic shifting mode in which a specific gear train is automatically selected in accordance with the vehicle speed and the throttle valve opening angle, besides a stepless automatic shifting mode in which the gear ratio is automatically varied in a continuously manner so that the internal combustion engine can be operated with optimum fuel efficiency (Japanese Examined Patent Publication No. H07-102791).

A control device for the transmission disclosed in the above publication is configured to switch the shifting mode between the stepless automatic shifting mode and the stepped automatic shifting mode in accordance with the vehicle speed and the throttle valve opening angle.

Let it be assumed that the transmission disclosed in the above publication is additionally equipped with the stepped manual mode, in addition to the stepless automatic shifting mode and the stepped automatic shifting mode. In this case, when the stepped manual mode is canceled by the driver while the vehicle is running in the stepped automatic shifting mode, for example, the stepless automatic shifting mode or the stepped automatic shifting mode is resumed as the shifting mode in accordance with the vehicle speed and throttle valve opening angle assumed at the time the stepped manual mode is canceled.

However, where either the stepless automatic shifting mode or the stepped automatic shifting mode is resumed as the shifting mode in accordance with the vehicle speed and throttle valve opening angle assumed at the time of cancelation of the stepped manual mode, the shifting mode resumed after the stepped manual mode is canceled by the driver may possibly differ from the shifting mode that had been selected before the stepped manual mode was set by the driver. Such a situation is not desirable because the difference in shifting mode possibly brings a feeling of strangeness to the driver.

SUMMARY OF THE INVENTION

An object of the present invention is to provide a control device for a transmission whereby recovery from a stepped manual mode can be carried out without causing a feeling of strangeness.

To achieve the object, the present invention provides a control device for a transmission mounted on a motor vehicle, comprising: a controller configured to switch between an automatic shifting mode and a manual shifting mode, the automatic shifting mode being selected when a shift lever is in an automatic shifting position, to cause the vehicle to run in a stepless automatic shifting mode in which a gear ratio is varied in a stepless manner or in a stepped automatic shifting mode in which the gear ratio is varied in a stepwise manner, the manual shifting mode being a mode in which the vehicle is run with the gear ratio varied stepwise by a driver's manipulation; and a manual mode selector configured to select the manual shifting mode in preference to the automatic shifting mode, wherein the controller performs, on detecting that the automatic shifting position is being selected when selection of the manual shifting mode is canceled, switchover to the automatic shifting mode and resumption of either the stepless automatic shifting mode or the stepped automatic shifting mode that had been selected before the manual shifting mode was selected.

Thus, when the manual shifting mode is canceled, the shifting mode is switched to the one that had been selected before the manual shifting mode was set. For example, if the shifting mode selected before the switchover to the manual shifting mode is the stepless automatic shifting mode, the shifting mode can be switched to the stepless automatic shifting mode, that is, the same shifting mode as that selected before the switchover to the manual shifting mode, when the manual shifting mode is canceled. On the other hand, if the shifting mode selected before the switchover to the manual shifting mode is the stepped automatic shifting mode, the shifting mode can be switched to the stepped automatic shifting mode, that is, the same shifting mode as that selected before the switchover to the manual shifting mode, when the manual shifting mode is canceled.

In this manner, after cancelation of the manual shifting mode, the shifting mode can be switched to the same shifting mode as that selected before the switchover to the manual shifting mode, and therefore, even in the case where the shifting position for the stepless automatic shifting mode and that for the stepped automatic shifting mode are an identical automatic shifting position, for example, D range, the driver can know to which of the stepless automatic shifting mode and the stepped automatic shifting mode the shifting mode has recovered from the manual shifting mode without a feeling of strangeness.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Embodiments of the present invention will be described below with reference to the drawings.

Figure 1:
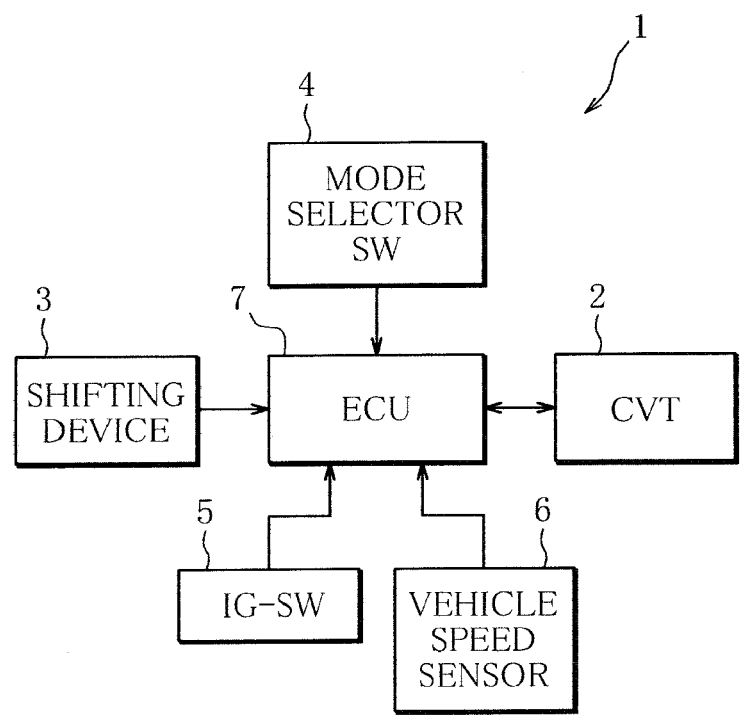
FIG. 1 illustrates a schematic configuration of a transmission system to which a control device for a transmission according to the present invention is applied.
Figure 2:
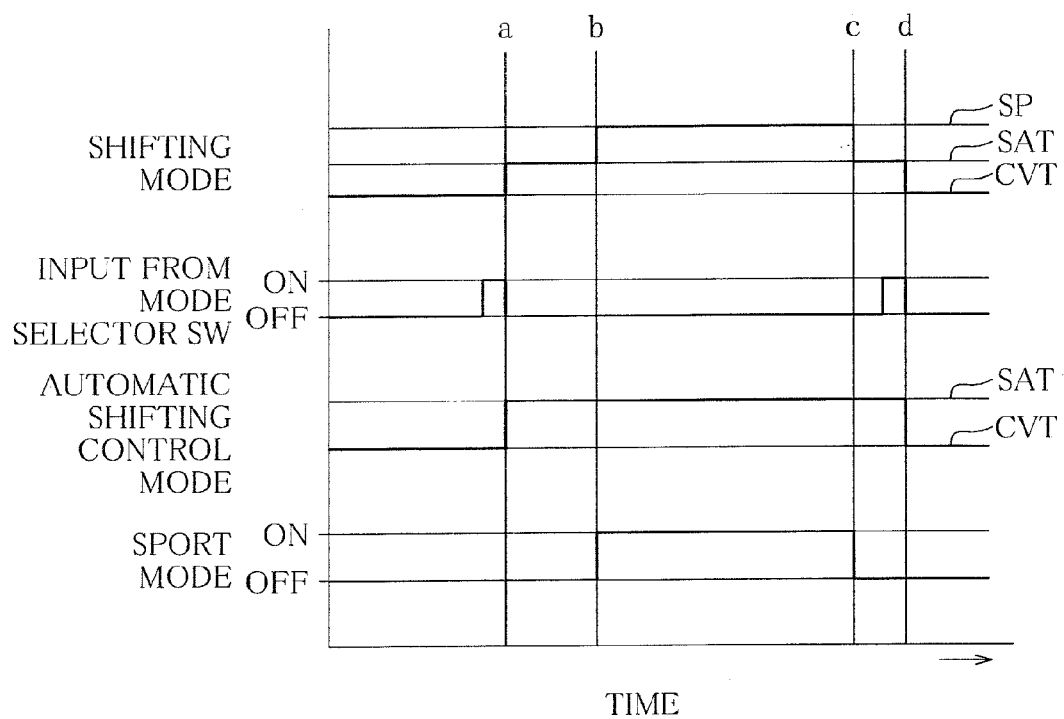
FIG. 2 illustrates temporal change of shifting mode switched by a transmission control device according to a first embodiment of the present invention.
Figure 3:
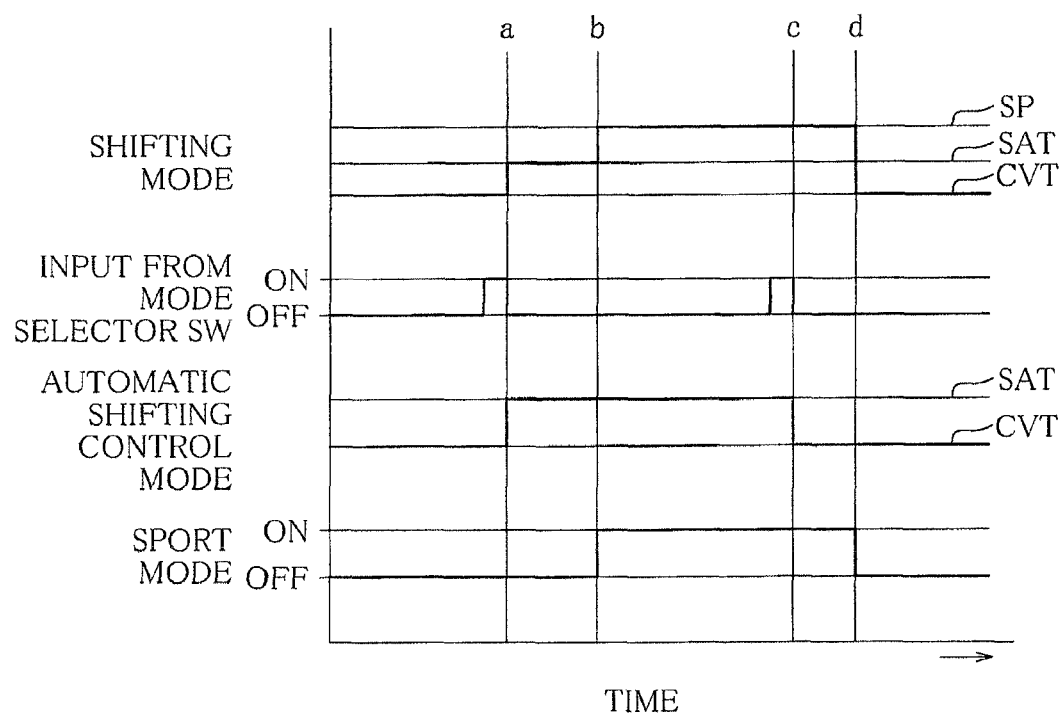
FIG. 3 also illustrates temporal change of the shifting mode switched by the transmission control device according to the first embodiment of the present invention.

FIG. 1 illustrates a schematic configuration of a transmission system to which a control device for a transmission according to a first embodiment of the present invention is applied, the control device being mounted on a motor vehicle, not shown. FIG. 2 illustrates temporal change of shifting mode switched by the transmission control device according to the first embodiment of the present invention, and FIG. 3 also illustrates temporal change of the shifting mode switched by the transmission control device according to the first embodiment of the present invention. FIGS. 2 and 3 individually show, from top to bottom, the status of shifting mode, the input from a MODE selector SW, the status of automatic shifting control mode, and the status of sport mode. Specifically, in FIGS. 2 and 3, the items along the vertical axis indicate the following: SHIFTING MODE indicates a currently selected shifting mode of a CVT, AUTOMATIC SHIFTING CONTROL MODE indicates a mode stored in an ECU for automatically shifting the CVT by the ECU, and SPORT MODE indicates whether or not the sport mode has been set by the driver. Further, in FIGS. 2 and 3, SP denotes the sport mode, SAT denotes STEP-AT automatic shifting mode, and CVT denotes CVT automatic shifting mode. Also, in FIGS. 2 and 3, the MODE selector SW is manipulated differently in the sport mode. In the following, the configuration of the stepless transmission system will be explained.

As illustrated in FIG. 1, the transmission system 1 includes a stepless transmission (hereinafter referred to as CVT) 2, a shifting device (manual mode selector) 3, a mode selector SW (selector switch) 4, an ignition switch (hereinafter referred to as IG-SW) 5 for switching on and off (ON/OFF) the main power supply to start and stop the vehicle, a vehicle speed sensor (vehicle speed detector) 6 for detecting the running speed of the vehicle, and an electronic control unit (hereinafter referred to as ECU) (controller) 7.

The CVT 2 is a transmission capable of continuously varying its transmission gear ratio. The CVT 2 transmits the output from an engine, not shown, to driving wheels while increasing or decreasing the speed of the output. Also, the CVT 2 has a CVT automatic shifting mode (corresponding to the stepless automatic shifting mode of the present invention) and a STEP-AT automatic shifting mode (corresponding to the stepped automatic shifting mode of the present invention) as automatic shifting control modes in accordance with which the ECU 7 controls shifting operation. The CVT automatic shifting mode is a mode in which the engine is operated in accordance with the running condition of the vehicle and the operating condition of the engine so that fuel efficiency can be optimized. The STEP-AT automatic shifting mode is a mode in which a specific one of a plurality of gear trains with respective fixed gear ratios is automatically selected in accordance with the vehicle speed, throttle valve opening angle and the like, as in a conventional stepped automatic transmission. Further, the CVT 2 has a sport mode (corresponding to the manual shifting mode of the present invention) as a manual shifting mode in which the driver controls the shifting operation. The sport mode differs from the STEP-AT automatic shifting mode, and is a mode in which the driver can select a specific gear train by manually operating the shifting device 3. Switchover among the CVT automatic shifting mode, the STEP-AT automatic shifting mode and the sport mode as well as the shifting operation in the CVT automatic shifting mode and the STEP-AT automatic shifting mode are carried out in accordance with signals supplied from the ECU 7.

The shifting device 3 includes a shift lever arranged in the vicinity of a center console, not shown, of the vehicle and a paddle provided at the back of the steering wheel. As the driver manipulates the shift lever, the shifting device 3 causes, in accordance with the position of the shift lever, the vehicle to stop for parking, move backward, or move forward in the CVT automatic shifting mode (stepless automatic shifting mode) or STEP-AT automatic shifting mode (stepped automatic shifting mode), and further sets the driving condition of the vehicle during forward running in the sport mode. In this embodiment, the stepless automatic shifting mode and the stepped automatic shifting mode will be collectively referred to as automatic shifting mode. In the automatic shifting mode, the shifting device 3 is generally in a D position (automatic shifting position). Also, while the sport mode is set, the shifting device 3 allows the driver to select a desired gear train by moving the shift lever from the D position to another position or by manipulating the paddle. The shifting device 3 supplies a manipulation signal of the shift lever or paddle to the ECU 7.

The MODE selector SW 4 is constituted by a momentary push-button switch. Each time the driver manipulates the MODE selector SW 4, the MODE selector SW 4 switches the automatic shifting mode of the CVT 2 between the CVT automatic shifting mode and the STEP-AT automatic shifting mode. The MODE selector SW 4 supplies a manipulation signal to the ECU 7. If the MODE selector SW 4 is manipulated while the CVT 2 is in the sport mode, the manipulation is stored in the ECU 7, and as soon as the sport mode is canceled, the shifting mode is switched an appropriate automatic shifting mode.

The ECU 7 is a control device for carrying out integrated control of the CVT 2 and includes input-output devices, storage devices, a CPU, and the like.

The input side of the ECU 7 is electrically connected with the CVT 2, shifting device 3, MODE selector SW 4, IG-SW 5 and vehicle speed sensor 7 so that the ECU 7 may be supplied with information about detected data from the various sensors, operating condition of the CVT 2, and manipulated condition of the shifting device 3.

On the other hand, the output side of the ECU 7 is electrically connected to the CVT 2.

When the shifting mode of the CVT 2 is the CVT automatic shifting mode, the ECU 7 varies the gear ratio of the CVT 2 in accordance with the running condition of the vehicle and the operating condition of the engine so that the fuel efficiency of the engine may be optimized. While the CVT 2 is operating in the STEP-AT automatic shifting mode, on the other hand, the ECU 7 automatically selects a specific gear train in according with the vehicle speed, throttle valve opening angle and the like, to cause the CVT 2 to perform shifting operation.

Also, the ECU 7 takes care of switchover among multiple shifting modes, namely, the switchover among the CVT automatic shifting mode (stepless automatic shifting mode) as an automatic shifting mode, the STEP-AT automatic shifting mode (stepped automatic shifting mode) as an automatic shifting mode, and the sport mode in which the driver is allowed to select a desired gear train by manipulating the shift lever or paddle of the shifting device 3. Specifically, when the IG-SW 5 is turned on (ON), the ECU 7 sets the automatic shifting control mode to the CVT automatic shifting mode and also sets the shifting mode to the CVT automatic shifting mode. Then, if the MODE selector SW 4 is manipulated while the CVT automatic shifting mode is selected as shown in FIG. 2, the ECU 7 sets the automatic shifting control mode to the STEP-AT automatic shifting mode and also switches the shifting mode to the STEP-AT automatic shifting mode (a in FIG. 2). If the MODE selector SW 4 is again manipulated while the STEP-AT automatic shifting mode is selected, the ECU 7 executes shifting mode switchover determination control for setting the automatic shifting control mode to the CVT automatic shifting mode and switching the shifting mode to the CVT automatic shifting mode.

Then, if the shift lever of the shifting device 3 is manipulated by the driver from the D position to another position while the automatic shifting control mode and the shifting mode are the CVT automatic shifting mode or STEP-AT automatic shifting mode, the ECU 7 stores information about the then-set shifting mode of the CVT 2, that is, retains the automatic shifting control mode, and switches the shifting mode of the CVT 2 to the sport mode (b in FIG. 2). If the shift lever of the shifting device 3 is again manipulated by the driver so as to cancel the sport mode, that is, if the sport mode is canceled, while the shifting mode of the CVT 2 is the sport mode, the ECU 7 switches the shifting mode of the CVT 2 to the shifting mode that had been selected before the sport mode was initiated, namely, the CVT automatic shifting mode or STEP-AT automatic shifting mode (c in FIG. 2) in accordance with the retained information on the automatic shifting control mode set before the sport mode was initiated, unless the MODE selector SW 4 is manipulated during execution of the sport mode. The shifting device 3 is in the D position when the CVT automatic shifting mode or STEP-AT automatic shifting mode is resumed, and therefore, the driver may be uncertain whether the CVT automatic shifting mode or the STEP-AT automatic shifting mode is being selected. However, if the driver remembers the mode selected before the switchover to the sport mode, then he/she can readily know which of the CVT automatic shifting mode and the STEP-AT automatic shifting mode is being selected. Then, when the MODE selector SW 4 is again manipulated, the ECU 7 sets the automatic shifting control mode and the shifting mode to the CVT automatic shifting mode if the shifting mode and automatic shifting control mode set before the switchover to the sport mode are the STEP-AT automatic shifting mode, and to the STEP-AT automatic shifting mode if the shifting mode and automatic shifting control mode set before the switchover to the sport mode are the CVT automatic shifting mode (d in FIG. 2).

Also, if the MODE selector switch SW 4 is manipulated during execution of the sport mode, the ECU 7 stores information about the automatic shifting control mode which is set after the MODE selector SW 4 is manipulated during execution of the sport mode. For example, if the shifting mode and automatic shifting control mode set before the switchover to the sport mode are the STEP-AT automatic shifting mode, the ECU 7 sets the automatic shifting control mode to the CVT automatic shifting mode after the MODE selector SW 4 is manipulated (c in FIG. 3). Then, when the shift lever of the shifting device 3 is again manipulated by the driver so as to cancel the sport mode, that is, when the sport mode is canceled, the ECU 7 executes shifting mode switchover determination control for the recovery from the sport mode, to set the shifting mode of the CVT 2 to the CVT automatic shifting mode (d in FIG. 3) in accordance with the stored information on the manipulation of the MODE selector SW 4 during execution of the sport mode, that is, the automatic shifting control mode set after the manipulation of the MODE selector SW 4.

First Embodiment

The following describes the first-mentioned shifting mode switchover determination control as well as the second-mentioned shifting mode switchover determination control for the recovery from the sport mode, both executed by the ECU 7 according to the first embodiment of the present invention.

Figure 4:
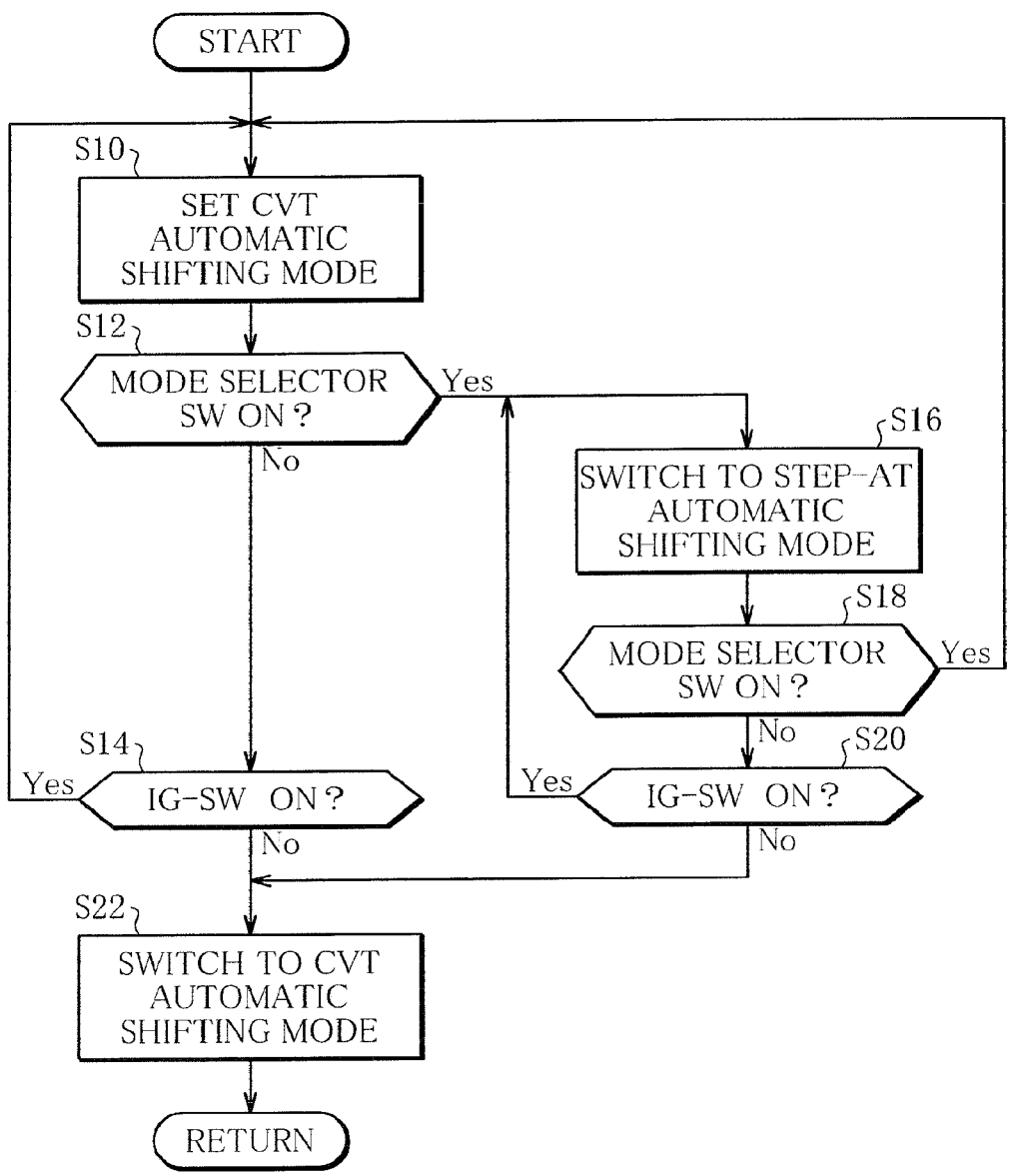
FIG. 4 is a flowchart illustrating shifting mode switchover determination control executed by the transmission control device according to the first embodiment of the present invention.
Figure 5:
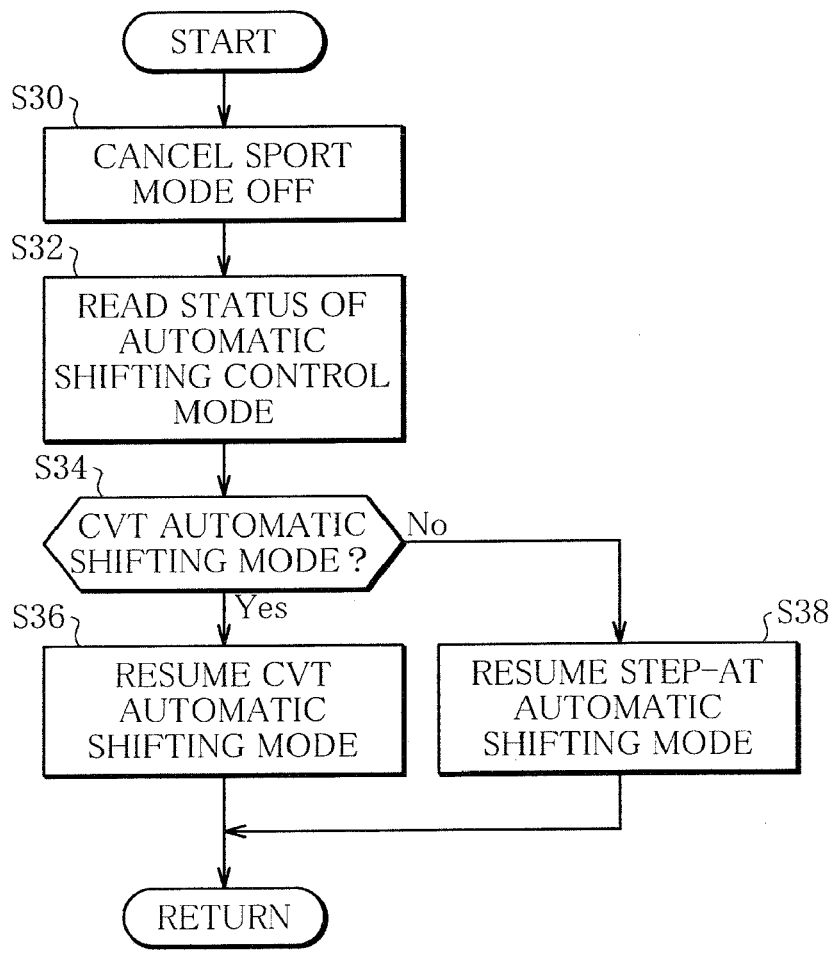
FIG. 5 is a flowchart illustrating shifting mode switchover determination control executed at the time of recovery from sport mode by the transmission control device according to the first embodiment of the present invention.

FIG. 4 is a flowchart illustrating the shifting mode switchover determination control executed by the transmission control device according to the first embodiment of the present invention, and FIG. 5 is a flowchart illustrating the shifting mode switchover determination control for the recovery from the sport mode, executed by the transmission control device according to the first embodiment of the present invention.

The first-mentioned shifting mode switchover determination control will be explained first. This shifting mode switchover determination routine is started when the IG-SW 5 is turned on, is regularly executed irrespective of the shifting mode of the CVT 2, and is terminated when the IG-SW 5 is turned off.

As illustrated in FIG. 4, the shifting mode of the CVT 2 is set to the CVT automatic shifting mode in Step S10. Specifically, the automatic shifting control mode is set to the CVT automatic shifting mode and also the shifting mode is set to the CVT automatic shifting mode. The routine then proceeds to Step S12.

In Step S12, it is determined whether or not the MODE selector SW 4 has been turned on. If the result of the determination is True (Yes) and thus the MODE selector SW 4 has been turned on, the routine proceeds of Step S16; if the result of the determination is False (No) and thus the MODE selector SW 4 has not been turned on, the routine proceeds to Step S14.

In Step S14, it is determined whether or not the IG-SW 5 is on. If the result of the determination is True (Yes) and thus the IG-SW 5 is on, the routine returns to Step S10; if the result of the determination is False (No) and thus the IG-SW 5 is not on, the routine proceeds to Step S22.

In Step S16, the shifting mode of the CVT 2 is switched to the STEP-AT automatic shifting mode (a in FIGS. 2 and 3). Specifically, the automatic shifting control mode is set to the STEP-AT automatic shifting mode and the shifting mode is switched to the STEP-AT automatic shifting mode. If the current shifting mode is the sport mode, information indicative of the STEP-AT automatic shifting mode is stored, that is, the automatic shifting control mode alone is set to the STEP-AT automatic shifting mode. The routine then proceeds to Step S18.

In Step S18, it is determined whether or not the MODE selector SW 4 has been turned on. If the result of the determination is True (Yes) and thus the MODE selector SW 4 has been turned on, the routine returns to Step S10; if the result of the determination is False (No) and thus the MODE selector SW 4 has not been turned on, the routine proceeds to Step S20.

In Step S20, it is determined whether or not the IG-SW 5 is on. If the result of the determination is True (Yes) and thus the IG-SW 5 is on, the routine returns to Step S16; if the result of the determination is False (No) and thus the IG-SW 5 is not on, the routine proceeds to Step S22.

In Step S22, the shifting mode of the CVT 2 is switched to the CVT automatic shifting mode. Specifically, the automatic shifting control mode is set to the CVT automatic shifting mode and the shifting mode is switched to the CVT automatic shifting mode (d in FIGS. 2 and 3), followed by termination of the routine.

Thus, according to the shifting mode switchover determination control, if the MODE selector SW 4 is manipulated by the driver while the CVT 2 is set in the CVT automatic shifting mode, the shifting mode of the CVT 2 is switched to the STEP-AT automatic shifting mode, and if the MODE selector SW 4 is manipulated by the driver while the CVT 2 is set in the STEP-AT automatic shifting mode, the shifting mode of the CVT 2 is switched to the CVT automatic shifting mode. Also, if the MODE selector SW 4 is manipulated by the driver while the shifting mode of the CVT 2 is the sport mode, the manipulation of the MODE selector SW 4 is stored, that is, the sport mode is maintained as the shifting mode and the automatic shifting control mode alone is switched.

The shifting mode switchover determination control for the recovery from the sport mode will now be described. This switchover determination control routine is executed when the shift lever of the shifting device 3 is manipulated by the driver so as to cancel the sport mode.

As shown in FIG. 5, when the shift lever of the shifting device 3 is manipulated by the driver while the shifting mode is the sport mode, the sport mode is switched off in Step S30, so that the sport mode is canceled. Then, the routine proceeds to Step S32.

In Step S32, the status of the automatic shifting control mode is read out. Specifically, the automatic shifting control mode currently set by the shifting mode switchover determination control illustrated in FIG. 4 is read out (at d of FIG. 3, for example, the CVT automatic shifting mode is read out). The routine then proceeds to Step S34.

In Step S34, it is determined whether or not the mode thus read out is the CVT automatic shifting mode. If the result of the determination is True (Yes) and thus the mode read out is the CVT automatic shifting mode, the routine proceeds to Step S36. If the result of the determination is False (No) and thus the mode read out is not the CVT automatic shifting mode, the routine proceeds to Step S38.

In Step S36, the automatic shifting control mode is set to the CVT automatic shifting mode, and the shifting mode of the CVT 2 is switched to the CVT automatic shifting mode, whereupon the routing returns.

In Step S38, the automatic shifting control mode is set to the STEP-AT automatic shifting mode, and the shifting mode of the CVT 2 is switched to the STEP-AT automatic shifting mode, whereupon the routing returns.

In this manner, with the transmission control device according to the first embodiment of the present invention, when the IG-SW 5 is turned on, the shifting mode and the automatic shifting control mode are set to the CVT automatic shifting mode. Then, if the MODE selector SW 4 is manipulated while the shifting mode and the automatic shifting control mode are the CVT automatic shifting mode, for example, the shifting mode and the automatic shifting control mode are set to the STEP-AT automatic shifting mode (at a in FIGS. 2 and 3), and if the MODE selector SW 4 is again manipulated while the shifting mode and the automatic shifting control mode are the STEP-AT automatic shifting mode, the shifting mode and the automatic shifting control mode are set to the CVT automatic shifting mode. Also, if the shift lever of the shifting device 3 is manipulated by the driver while the shifting mode of the CVT 2 and the automatic shifting control mode are either the CVT automatic shifting mode or the STEP-AT automatic shifting mode, the shifting mode then selected in the CVT 2 is stored, that is, the automatic shifting control mode is left unchanged, and the shifting mode of the CVT 2 is switched to the sport mode (b in FIGS. 2 and 3). Then, if the shift lever of the shifting device 3 is again manipulated by the driver to cancel the sport mode, that is, if the sport mode is canceled, while the sport mode is selected as the shifting mode of the CVT 2, the shifting mode of the CVT 2 is switched to the mode that had been selected before the switchover to the sport mode (in the example illustrated in FIG. 2, to the STEP-AT automatic shifting mode), that is, the maintained automatic shifting control mode (c in FIG. 2), unless the MODE selector SW 4 is manipulated during execution of the sport mode. When the MODE selector SW 4 is again manipulated, the shifting mode and the automatic shifting control mode are switched to the CVT automatic shifting mode if the shifting mode and automatic shifting control mode set before the switchover to the sport mode are the STEP-AT automatic shifting mode, and are switched to the STEP-AT automatic shifting mode if the shifting mode and automatic shifting control mode set before the switchover to the sport mode are the CVT automatic shifting mode (d in FIG. 2).

Also, if the MODE selector SW 4 is manipulated while the sport mode is selected as the shifting mode, the manipulation of the MODE selector SW 4 is stored, that is, the automatic shifting control mode is set to the CVT automatic shifting mode or STEP-AT automatic shifting mode in response to the manipulation of the MODE selector SW 4 (for example, if the shifting mode and automatic shifting control mode set before the switchover to the sport mode are the STEP-AT automatic shifting mode as shown in FIG. 3, the automatic shifting control mode is set to the CVT automatic shifting mode (c in FIG. 3)). When the shift lever of the shifting device 3 is again manipulated by the driver so as to cancel the sport mode, that is, when the sport mode is canceled, the shifting mode of the CVT 2 is switched to the mode based on the manipulation of the MODE selector SW 4 during execution of the sport mode, that is, the automatic shifting control mode that has been switched in response to the manipulation of the MODE selector SW 4 (d in FIG. 3).

Consequently, when the sport mode is canceled, the shifting mode is switched to the mode identical with the automatic shifting control mode that had been set before the switchover to the sport mode, unless the MODE selector SW 4 is manipulated during execution of the sport mode. For example, if the shifting mode selected before the switchover to the sport mode is the CVT automatic shifting mode, the shifting mode can be switched to the CVT automatic shifting mode, which is identical with the shifting mode selected before the switchover to the sport mode, when the sport mode is canceled. If the shifting mode selected before the switchover to the sport mode is the STEP-AT automatic shifting mode, the shifting mode can be switched to the STEP-AT automatic shifting mode, which is identical with the shifting mode selected before the switchover to the sport mode, when the sport mode is canceled.

In this manner, after the cancellation of the sport mode, the shifting mode can be switched to the shifting mode identical with that selected before the switchover to the sport mode, and therefore, the driver can be certain whether the CVT automatic shifting mode or the STEP-AT automatic shifting mode is resumed after the sport mode without a feeling of strangeness.

Also, while the sport mode is selected, information indicative of the manipulation of the MODE selector SW 4 is stored, that is, the automatic shifting control mode stored in the ECU 7 is switched, and when the sport mode is canceled, the shifting mode is switched to the CVT automatic shifting mode or STEP-AT automatic shifting mode in accordance with the stored information on the manipulation of the MODE selector SW 4, that is, the automatic shifting control mode that has been switched. For example, let it be assumed that the shifting mode and automatic shifting control mode set prior to the switchover to the sport mode are the CVT automatic shifting mode, and in this case, when the MODE selector SW 4 is manipulated by the driver after the shift lever of the shifting device 3 is manipulated by the driver to set the shifting mode to the sport mode, the manipulation of the MODE selector SW 4 is stored, that is, the automatic shifting control mode stored in the ECU 7 is switched to the STEP-AT automatic shifting mode. When the sport mode is canceled thereafter, the shifting mode can be switched to the STEP-AT automatic shifting mode in accordance with the stored manipulation of the MODE selector SW 4, that is, the automatic shifting control mode stored in the ECU 7. On the other hand, where the shifting mode and automatic shifting control mode set before the switchover to the sport mode are the STEP-AT automatic shifting mode, if the MODE selector SW 4 is manipulated by the driver after the shift lever of the shifting device 3 is manipulated by the driver to set the shifting mode to the sport mode, the manipulation of the MODE selector SW 4 is stored, that is, the automatic shifting control mode stored in the ECU 7 is switched to the CVT automatic shifting mode. When the sport mode is canceled thereafter, the shifting mode can be switched to the CVT automatic shifting mode in accordance with the stored manipulation of the MODE selector SW 4, that is, the automatic shifting control mode stored in the ECU 7.

Thus, when the sport mode is cancelled, that is, at the time of recovery from the sport mode, the driver's desired shifting mode can be resumed on the basis of the manipulation of the MODE selector SW 4 by the driver, and therefore, the driver can recognize recovery from the sport mode without a feeling of strangeness.

Second Embodiment

In the following, a control device for a transmission according to a second embodiment of the present invention will be explained.

The second embodiment differs from the first embodiment in that, in the shifting mode switchover determination control for the recovery from the sport mode, the vehicle speed detected by the vehicle speed sensor (vehicle speed detector) 6 is additionally used in determining the shifting mode at the time of recovery from the sport mode. The following describes the shifting mode switchover determination control for the recovery from the sport mode, executed by the transmission control device according to the second embodiment.

Figure 6:
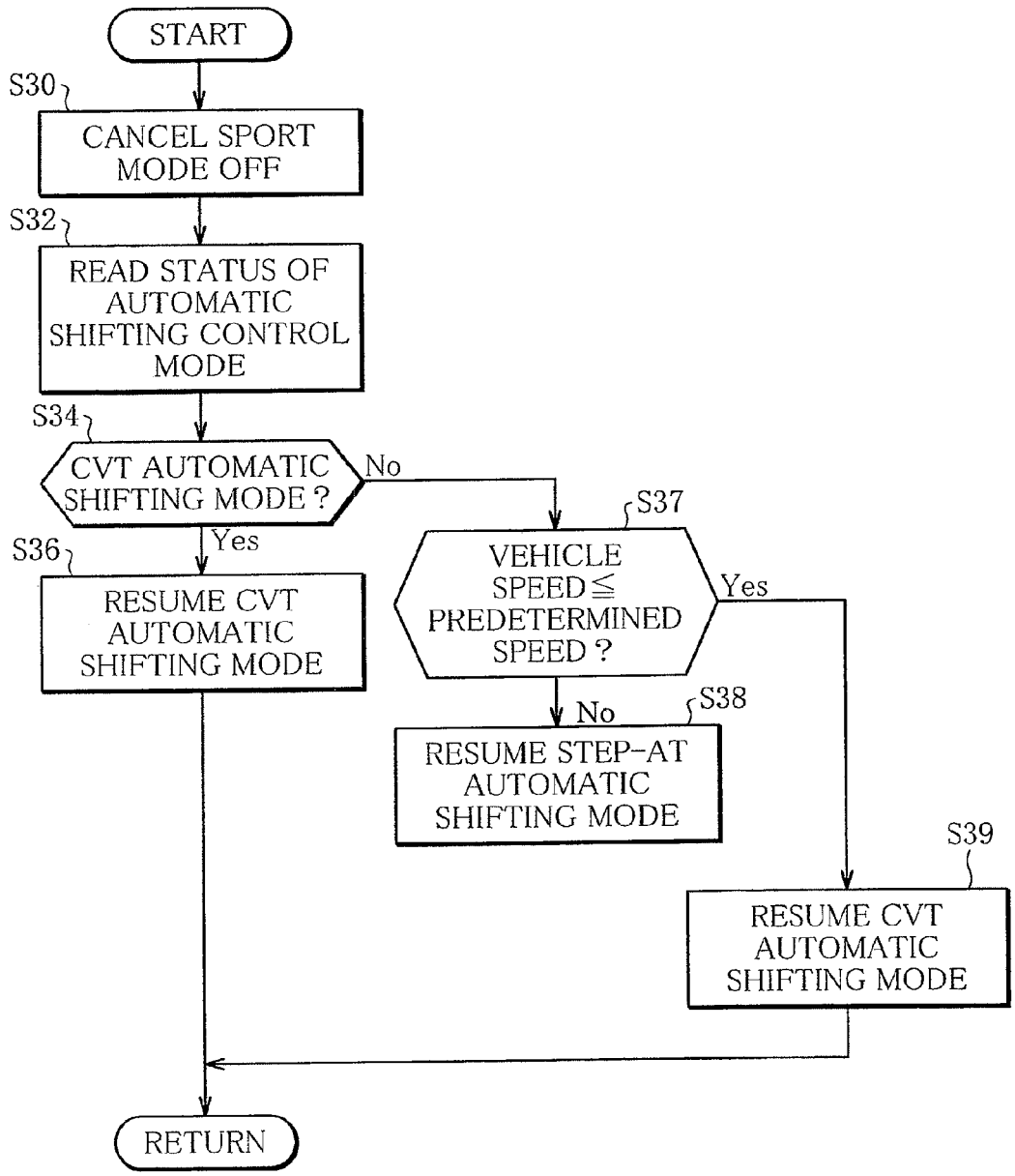
FIG. 6 is a flowchart illustrating shifting mode switchover determination control executed at the time of recovery from the sport mode by a transmission control device according to a second embodiment of the present invention.

FIG. 6 is a flowchart illustrating the shifting mode switchover determination control executed at the time of recovery from the sport mode by the transmission control device according to the second embodiment of the present invention. This switchover determination control routine is executed when the shift lever of the shifting device 3 is manipulated by the driver so as to cancel the sport mode.

As shown in FIG. 6, when the shift lever of the shifting device 3 is manipulated by the driver while the sport mode is selected as the shifting mode, the sport mode is switched off in Step S30, so that the sport mode is canceled. Then, the routine proceeds to Step S32.

In Step S32, the status of the automatic shifting control mode is read out. Specifically, the automatic shifting control mode currently set by the shifting mode switchover determination control illustrated in FIG. 4 is read out (at d of FIG. 3, for example, the CVT automatic shifting mode is read out). The routine then proceeds to Step S34.

In Step S34, it is determined whether or not the mode thus read out is the CVT automatic shifting mode. Specifically, it is determined whether the automatic shifting control mode currently set by the shifting mode switchover determination control illustrated in FIG. 4 is the CVT automatic shifting mode or not. If the result of the determination is True (Yes) and thus the currently set mode is the CVT automatic shifting mode, the routine proceeds to Step S36; if the result of the determination is False (No) and thus the currently set mode is not the CVT automatic shifting mode, the routine proceeds to Step S37.

In Step S36, the automatic shifting control mode is set to the CVT automatic shifting mode, and the shifting mode of the CVT 2 is switched to the CVT automatic shifting mode, whereupon the routing returns.

In Step S37, it is determined whether or not the detected vehicle speed indicates a speed lower than or equal to a predetermined vehicle speed (predetermined speed). If the result of the determination is True (Yes) and thus the vehicle speed is lower than or equal to the predetermined vehicle speed, the routine proceeds to Step S39; if the result of the determination is False (No) and the vehicle speed is not lower than or equal to the predetermined vehicle speed, the routine proceeds to Step S38. The predetermined vehicle speed is set to a low vehicle speed at and below which the fuel consumption by the engine can be improved by selecting the CVT automatic shifting mode, rather than the STEP-AT automatic shifting mode.

In Step S38, the automatic shifting control mode is set to the STEP-AT automatic shifting mode, and the shifting mode of the CVT 2 is switched to the STEP-AT automatic shifting mode, whereupon the routing returns.

In Step S39, the automatic shifting control mode is set to the CVT automatic shifting mode, and the shifting mode of the CVT 2 is switched to the CVT automatic shifting mode, whereupon the routing returns.

In this manner, with the transmission control device according to the second embodiment of the present invention, when the MODE selector SW 4 is manipulated while the sport mode is selected as the shifting mode and if the automatic shifting control mode set after the MODE selector SW 4 is manipulated during execution of the sport mode is the STEP-AT automatic shifting mode, a determination is made as to whether or not the detected vehicle speed indicates a speed lower than or equal to the predetermined vehicle speed. If the vehicle speed is lower than or equal to the predetermined vehicle speed, the CVT automatic shifting mode is set as the shifting mode of the CVT 2 after cancelation of the sport mode.

Thus, by setting the CVT automatic shifting mode as the shifting mode after the sport mode, the engine can be operated at such a rotating speed and a load as to optimize fuel efficiency even while the vehicle is running at low speeds, whereby fuel efficiency can be improved.

While the embodiments of the present invention have been described above, it is to be noted that the invention is not limited to the foregoing embodiment.

For example, in the second embodiment, if the vehicle speed is lower than or equal to the predetermined vehicle speed while the STEP-AT automatic shifting mode is selected as the shifting mode, the shifting mode is switched to the CVT automatic shifting mode, but the control procedure is not limited to this alone. For example, information about the gear train selected in the sport mode may be acquired from the transmission (gear position detector), and if the gear train (gear position) selected at the time of cancelation of the sport mode is equal to lower in speed than a predetermined gear train (predetermined gear position) which provides a low vehicle speed, the CVT automatic shifting mode may be set as the shifting mode. Also, by setting the CVT automatic shifting mode in this manner, the engine can be operated at such a rotating speed and a load as to optimize fuel efficiency even while the vehicle is running at low speeds, whereby fuel efficiency can be improved.

The automatic shifting mode to be resumed after the sport mode is set to the CVT automatic shifting mode or STEP-AT automatic shifting mode in accordance with the vehicle speed or the gear train selected at the time of cancelation of the sport mode, but the manner of selecting the automatic shifting mode is not limited to this alone. For example, the frequencies of use of the CVT automatic shifting mode and STEP-AT automatic shifting mode by the driver may be stored, and when the difference between the use frequency of the CVT automatic shifting mode and that of the STEP-AT automatic shifting mode is greater than or equal to a predetermined value, that automatic shifting mode of which the use frequency is higher may be set as the automatic shifting mode to be resumed after the sport mode. This permits the automatic shifting mode to be set to the mode preferred by the driver.

What is claimed is:

1. A control device for a transmission mounted on a motor vehicle, comprising:
   a controller configured to switch between an automatic shifting mode and a manual shifting mode, the automatic shifting mode being selected when a shift lever is in an automatic shifting position, to switch between a stepless automatic shifting mode in which a gear ratio is varied in a stepless manner and a stepped automatic shifting mode in which the gear ratio is varied in a stepwise manner, the manual shifting mode being a mode in which the vehicle is run with the gear ratio varied stepwise by a driver's manipulation,
   a manual mode selector configured to select the manual shifting mode in preference to the automatic shifting mode, and
   a selector switch configured to select one of the stepless automatic shifting mode and the stepped automatic shifting mode, wherein,
   the controller performs, on detecting that the automatic shifting position is being selected when selection of the manual shifting mode is canceled, switchover to the automatic shifting mode and resumption of either the stepless automatic shifting mode or the stepped automatic shifting mode that had been selected before the manual shifting mode was selected, and
   the controller stores a selected one of the stepless automatic shifting mode and the stepped automatic shifting mode when the selector switch is manipulated while the manual shifting mode is selected, and switches over to the stored one of the stepless automatic shifting mode and the stepped automatic shifting mode when the manual shifting mode is canceled.

2. The control device according to claim 1, further comprising:
   a gear position detector configured to detect a gear position selected in the manual shifting mode,
   wherein the controller forcibly causes switchover to the stepless automatic shifting mode when the manual shifting mode is canceled while the gear position being selected in the manual shifting mode is lower than a predetermined gear position.

3. The control device according to claim 1, further comprising:
   a vehicle speed detector configured to detect a speed of the vehicle,
   wherein the controller forcibly causes switchover to the stepless automatic shifting mode when the manual shifting mode is canceled while the speed of the vehicle is lower than or equal to a predetermined speed.

4. The control device according to claim 1, wherein
   the transmission includes a continuously variable transmission configured to continuously vary a gear ratio.

* * * * *